Jan. 10, 1933.  E. G. GUNN  1,894,036
BRAKE
Filed Sept. 6, 1928   2 Sheets-Sheet 1

Witness:
Chas. R. Koursh.

Inventor,
Earl G. Gunn,
Offield Neilhope Soott+Poole
Attys.

Jan. 10, 1933.  E. G. GUNN  1,894,036
BRAKE
Filed Sept. 6, 1928  2 Sheets-Sheet 2
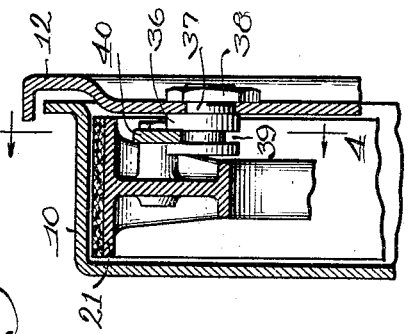
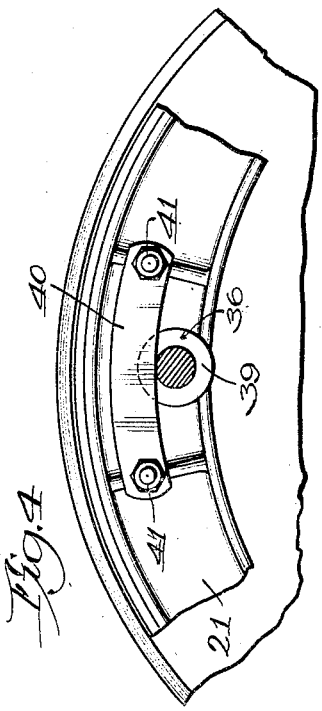
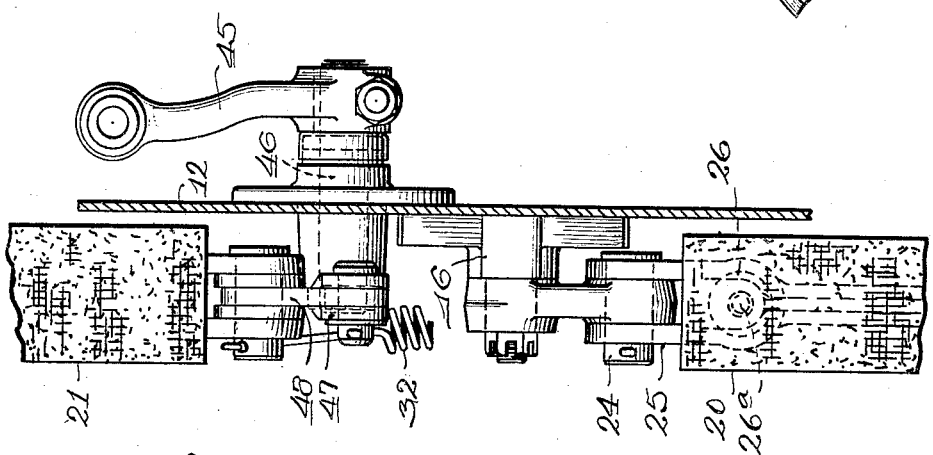

Patented Jan. 10, 1933

1,894,036

UNITED STATES PATENT OFFICE

EARL G. GUNN, OF RACINE, WISCONSIN, ASSIGNOR TO THE NASH MOTORS COMPANY, OF KENOSHA, WISCONSIN, A CORPORATION OF MARYLAND

BRAKE

Application filed September 6, 1928. Serial No. 304,244.

This invention relates to improvements in brake mechanism for motor vehicles, and more particularly to internal shoe brakes having a servo action.

The principal object of the invention is to provide a simple and more efficient construction for brakes of this character wherein the shoes may position themselves properly relative to the brake drum when engaged, so as to eliminate many of the objectionable features existing in present constructions.

As heretofore constructed, a plurality of shoe members are pivoted end to end and arranged so that the shoes are moved into engagement by circumferential movement thereof in the same direction as the normal direction of rotation of the wheel, the general arrangement being such that the initial braking engagement of the wheel drum against the brakes produces the servo action of the brakes in a manner well known in the art. With brakes of this character, however, it has heretofore been found necessary to use a lining with a relatively low co-efficient of friction in order to avoid excessive wrapping in, and locking of the brakes when this servo action occurs, and furthermore, it is necessary to cut off or relieve the brake lining at certain points, especially at the heel and toe of each brake section, so as to relieve excessive pressures at these points which have a tendency to produce chattering, groaning or locking.

In carrying out my invention, I provide an improved construction including means for connecting adjacent shoe sections by means of a double hinged joint or link in which the same servo action is retained, but which permits each of the shoe sections to adjust itself more readily to the proper curvature of the drum, independently of the position of the adjacent shoe section or sections, and thus eliminate the danger of excessive localized pressures on the separate shoe sections, and the related difficulties above referred to, and also permit the use of more brake lining than heretofore.

The invention may best be understood by reference to the accompanying drawings, in which Figure 1 is a face view of a brake constructed in accordance with my invention.

Figure 2 is a detail side view of the brake shown in Figure 1.

Figure 3 is a section taken on line 3—3 of Figure 1.

Figure 4 is a section taken on line 4—4 of Figure 3.

Figure 1:
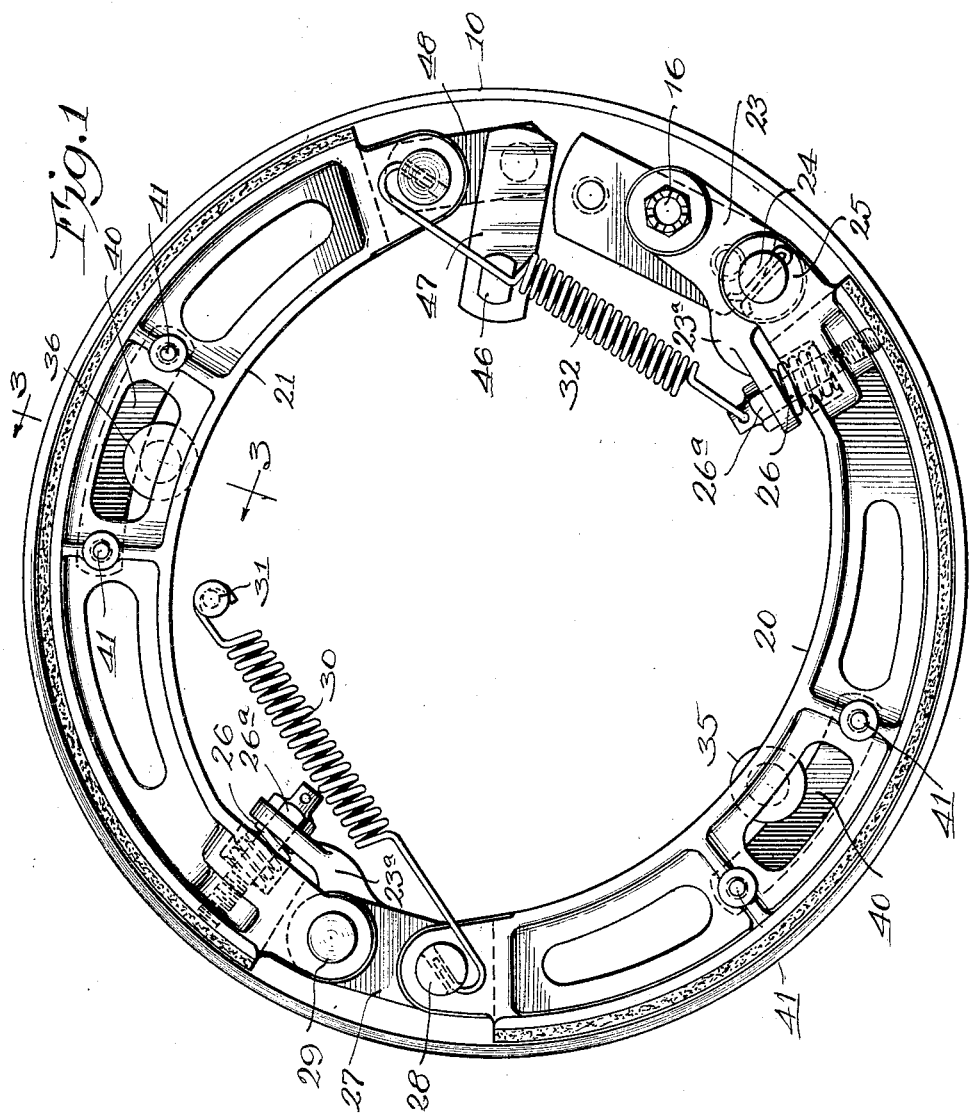

Referring now to details of the drawings, the brake drum 10 is carried by the wheel in the usual manner, and a backing plate 12 is mounted on the wheel spindle (not shown) having the braking mechanism carried thereon.

The braking mechanism shown herein comprises two shoes 20 and 21 connected together for servo action. One end of the brake shoe 20 is anchored to the backing plate by suitable means, such as an anchor lug 16, and a link 23 relatively short in length and pivoted at one end on the anchor lug 16 and at the other end to a pin 24 passing through a clevis 25 at the inner end or heel of the shoe 20.

The link 23 is provided with an extension 23a offset inwardly of the shoe 20, having compression means such as a spring 26 interposed between said extension and the shoe 20, tending to maintain said link in relative fixed, but yielding relation to said shoe. In the form shown, the spring 26 is coiled on a pin 26a passing through the extension 23a and shoe 20.

The second shoe 21 is connected to the toe end of the shoe 20 by a link 27 and pivot pins 28 and 29, and having an extension 23a compression spring 26 and pin 26a similar in construction and function to corresponding parts of link 23 heretofore described. It will be observed that the pin 28 serves as a movable anchor for the second shoe 21 in the servo system.

The shoes are normally maintained out of operative position by suitable means, such as a spring 30 connected between the toe of shoe 20 and a stop 31 on the backing plate in position to normally withdraw said shoe from engagement with the drum 10, and another spring 32 connected to the toe of shoe 21 and to another relatively fixed point, as for instance, to the head of pin 26a forming a part of the link 23.

Suitable stop and positioning means are provided for the shoes, which herein comprises a pair of studs 35 and 36 each mounted on an eccentric pin 37 extending through the backing plate 12 and adjustably secured against rotation by means of a lock nut 38. Each of said studs are provided with an annular recess 39 around its periphery adapted to receive therein a plate 40 secured longitudinally of an intermediate portion of each of the shoes 20 and 21, as by bolts 41, 41. The arrangement is such that the plates 40 engage within their respective annular recesses 39 of studs 35 and 36 to position the shoes against movement longitudinally of the axis of the brake, and also limit the inward movement of the shoes caused by action of the springs 30 and 32. Adjustment of the studs is afforded by rotation of their eccentric pins 37 outside of the backing plate.

The brake may be operated by circumferential movement of the toe of shoe 21 in a counter-clockwise direction by any suitable means. As shown herein the lever 45 on the outside of the backing plate is connected to a shaft 46 extending through said plate and having a lever 47 mounted thereon pivotally connected to the end of the shoe through a link 48. It will be understood that the operating lever 45 is connected through any suitable control system to the brake pedal.

It will now be understood from the above description that the provision of the links 23 and 27 provides hinged points at pins 16 and 28 which normally act as fixed hinged points for their respective shoes and links, but when pressure is applied, the links yield outwardly so as to permit the shoes 20 and 21 to automatically position themselves in proper position relative to the brake drum. This eliminates the objectionable features hereinbefore described in connection with previous constructions, permits the use of more brake lining than heretofore, and affords more efficient and satisfactory functioning of brakes of this character.

Although I have shown and described the particular embodiment of my invention, it will be understood that I do not wish to be limited to the exact construction shown and described, but that various changes and modifications may be made without departing from the spirit and scope of my invention.

I claim as my invention:

1. In a wheel brake having a drum and a series of brake shoes mounted for servo action relative thereto, means connecting adjacent brake shoes including a double hinged link and yielding means between said link and the shoe further removed from the anchored end of the series normally holding said link and shoe at a predetermined angle, but permitting the last named shoe to automatically reposition itself against the tension of said yielding means when under braking torque in substantially concentric relation to said drum.

2. In a wheel brake, a drum, a relatively rigid brake shoe, an anchor, means connecting said shoe and said anchor including a double hinged link, and means between said link and said shoe yieldingly urging the latter toward said drum, but permitting bodily radial movement of said link and the adjacent end of said shoe relative to its anchor, and permitting said shoe to automatically re-position itself against the tension of said yielding means when under braking torque in substantially concentric relation to said drum.

3. In a wheel brake having a drum and a relatively rigid brake shoe, an anchor, a link disposed in generally circumferential alignment between said brake shoe and said anchor, a yieldable connection between said shoe and said link normally urging the latter toward the drum at a predetermined angle, but yieldable under braking torque to permit said yieldable connection to move radially toward said drum, with said shoe at a decreased angle relative to said link.

4. In a wheel brake, a drum, a relatively rigid brake shoe, an anchor, a double hinged link disposed generally circumferentially of said drum and connecting said anchor and shoe, tension means normally tending to retract the free end of said shoe from said drum, stop means engageable with an intermediate portion of said shoe, yielding means between said shoe and said link normally resisting the reaction of said tension means about said stop so as to urge the adjacent end of said shoe toward said drum, but permitting said shoe, under braking torque, to re-position itself concentric with the drum at a decreased angle relative to said link.

5. In a wheel brake having a drum and a series of brake shoes mounted for servo action relative thereto, means connecting adjacent brake shoes including a double hinged link, and yielding means between said link and the shoe further removed from the anchored end of the series tending to urge the adjacent end of said last named shoe toward said drum, and other yielding means tending to hold the free end of said last named shoe away from said drum.

6. In a wheel brake, a drum, a brake shoe, an anchor, means connecting said shoe and said anchor including a double hinged link and permitting radial movement of the adjacent end of said shoe relative to its anchor, yielding means between said link and said shoe tending to urge the adjacent end of said shoe toward said drum, and other yielding means tending to hold the free end of said shoe away from said drum.

Signed at Chicago, Ill., this 23rd day of August, 1928.

EARL G. GUNN.